United States Patent
Sturgin et al.

(10) Patent No.: US 12,460,704 B2
(45) Date of Patent: Nov. 4, 2025

(54) ROTARY ACTUATOR FOR FLIGHT CONTROL SURFACE

(71) Applicant: Schaeffler Technologies AG & Co. KG, Herzogenaurach (DE)

(72) Inventors: Todd Sturgin, Wooster, OH (US); Craig Hooker, Indian Land, SC (US); Nicholas Hrusch, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/595,790

(22) Filed: Mar. 5, 2024

(65) Prior Publication Data
US 2025/0146562 A1 May 8, 2025

Related U.S. Application Data

(60) Provisional application No. 63/547,457, filed on Nov. 6, 2023.

(51) Int. Cl.
*F16H 19/08* (2006.01)
*B64C 13/50* (2006.01)

(52) U.S. Cl.
CPC ............. *F16H 19/08* (2013.01); *B64C 13/50* (2013.01)

(58) Field of Classification Search
CPC ....... B64C 13/50; B64C 13/341; B64C 13/34; B64C 13/505; F16H 1/46; F16H 2001/289; F16H 25/205; F16H 19/08; F16H 37/0826
See application file for complete search history.

(56) References Cited

U.S. PATENT DOCUMENTS

| | | | | |
|---|---|---|---|---|
| 2,371,607 A | * | 3/1945 | Collins | G01M 13/026 92/108 |
| 4,637,272 A | * | 1/1987 | Teske | F16H 25/205 244/99.2 |
| 4,751,855 A | * | 6/1988 | Hudson | F16H 1/46 475/342 |
| 4,979,700 A | * | 12/1990 | Tiedeman | B64C 13/34 244/99.2 |
| 5,214,972 A | * | 6/1993 | Larson | B64C 13/505 74/89.26 |
| 5,518,466 A | * | 5/1996 | Tiedeman | F16H 35/10 475/341 |
| 6,875,145 B2 | | 4/2005 | McKay et al. | |

(Continued)

*Primary Examiner* — Jake Cook
(74) *Attorney, Agent, or Firm* — Price Heneveld LLP

(57) ABSTRACT

A rotary actuator for a flight control surface includes a first electric motor connected to a first geartrain having planetary gearsets in series and a first drive gear driven by the first electric motor via the first geartrain. The first geartrain and the first drive gear define a first powertrain. The rotary actuator also includes a second electric motor connected to a second geartrain having planetary gearsets in series. The second geartrain is separate from the first geartrain. The rotary actuator further includes a second drive gear driven by the second electric motor via the second geartrain. The second geartrain and the second drive gear define a second powertrain that is coaxial with the first powertrain. Additionally, the rotary actuator includes an output shaft parallel to the first and second powertrains. The output shaft is driven simultaneously via the first and second drive gears.

18 Claims, 7 Drawing Sheets

(56) References Cited

U.S. PATENT DOCUMENTS

| | | | | |
|---|---|---|---|---|
| 8,336,817 | B2 * | 12/2012 | Flatt | H02K 7/108 |
| | | | | 244/99.2 |
| 9,701,397 | B2 | 7/2017 | Grand | |
| 9,976,639 | B2 * | 5/2018 | Yasui | F16H 35/10 |
| 10,082,442 | B2 * | 9/2018 | Yasui | G01R 19/0092 |
| 10,281,033 | B2 * | 5/2019 | Kopp | B64C 13/341 |
| 11,073,195 | B2 * | 7/2021 | Smania | H02K 7/116 |

* cited by examiner

ROTARY ACTUATOR FOR FLIGHT CONTROL SURFACE

CROSS-REFERENCE TO RELATED APPLICATIONS

This application claims the benefit of priority under 35 U.S.C. § 119 of U.S. Provisional Application No. 63/547,457, filed on Nov. 6, 2023, the entire contents of which are incorporated herein by reference.

FIELD OF THE DISCLOSURE

This disclosure is generally related to an actuator for a flight control surface of an aircraft.

BACKGROUND OF THE DISCLOSURE

Actuators, such as pistons and solenoids, can be used in a variety of aerospace applications to move a flight control surface to a desired location, position, or angle. Flight control surfaces can include, but are not limited to, flaps, ailerons, spoilers, slats, elevators, rudders, and tabs.

SUMMARY OF THE DISCLOSURE

According to a first aspect of the present disclosure, a rotary actuator for a flight control surface includes a first electric motor drivably connected to a first geartrain having at least two planetary gearsets arranged in series and a first drive gear driven by the first electric motor via the first geartrain. The first geartrain and the first drive gear define a first powertrain. The rotary actuator also includes a second electric motor drivably connected to a second geartrain having at least two planetary gearsets arranged in series. The second geartrain is separate from the first geartrain. The rotary actuator further includes a second drive gear driven by the second electric motor via the second geartrain. The second geartrain and the second drive gear define a second powertrain that is arranged coaxially with the first powertrain. Additionally, the rotary actuator includes an output shaft that is driven simultaneously via the first drive gear and the second drive gear.

Embodiments of the first aspect of the disclosure can include any one or a combination of the following features:
the first electric motor and the second electric motor are axially adjacent to each other;
the first drive gear and the second drive gear are arranged at axial outer ends of the first powertrain and the second powertrain, respectively;
the first and second geartrains each comprise three planetary gearsets;
the output shaft is configured to rotate less than one revolution; and
the output shaft further comprises a first sector gear arranged at a first end of the output shaft and engaged with the first drive gear and a second sector gear arranged at a second end of the output shaft and engaged with the second drive gear.

According to a second aspect of the present disclosure, a rotary actuator for moving a flight control surface of an aircraft includes a first electric motor drivably connected to a first geartrain having a plurality of planetary gearsets arranged in series, a first drive gear driven by the first electric motor via the first geartrain, and an output shaft arranged parallel to the first powertrain and configured to be driven by the first drive gear. The first geartrain and the first drive gear define a first powertrain.

Embodiments of the second aspect of the disclosure can include any one or a combination of the following features:
a full stroke of the rotary actuator prompts less than a full revolution of the output shaft;
the output shaft further comprises a first sector gear that is engaged with the first drive gear;
the rotary actuator further comprises a second electric motor drivably connected to a second geartrain having at least one gearset, and a second drive gear driven by the second electric motor via the second geartrain, wherein the second geartrain and the second drive gear define a second powertrain, wherein the second powertrain is operably coupled with the output shaft, such that the first and second powertrains are configured to simultaneously drive the output shaft;
the at least one gearset comprises at least one planetary gearset;
the at least one planetary gearset comprises a plurality of planetary gearsets arranged in series;
the first and second electric motors are axially adjacent to each other;
the first geartrain is axially adjacent the first electric motor opposite the second electric motor;
the second geartrain is axially adjacent the second electric motor opposite the first electric motor; and
the first geartrain comprises three planetary gearsets.

According to a third aspect of the present disclosure, a rotary actuator includes a first powertrain that includes a first electric motor, a first geartrain operably coupled with the first electric motor and having at least one gearset, and a first drive gear operably coupled with the first electric motor via the first geartrain. The rotary actuator also includes a second powertrain that includes a second electric motor, a second geartrain operably coupled with the second electric motor and having at least one gearset, and a second drive gear operably coupled with the second electric motor via the second geartrain. The first electric motor is positioned axially adjacent to the second electric motor, the first geartrain is positioned axially adjacent to the first electric motor, and the second geartrain is positioned axially adjacent to the second electric motor, such that the first and second electric motors are positioned axially between the first and second geartrains. The rotary actuator further includes an output shaft arranged parallel to the first and second powertrains and configured to be driven by the first and second powertrains.

Embodiments of the third aspect of the disclosure can include any one or a combination of the following features:
the at least one gearset of the first geartrain comprises at least one planetary gearset, and the at least one gearset of the second geartrain comprises at least one planetary gearset;
the at least one planetary gearset of the first geartrain comprises a plurality of planetary gearsets arranged in series, and the at least one planetary gearset of the second geartrain comprises a plurality of planetary gearsets arranged in series; and
driven rotation of the output shaft is configured to move a flight control surface of an aircraft.

These and other features, advantages, and objects of the present disclosure will be further understood and appreciated by those skilled in the art by reference to the following specification, claims, and appended drawings.

Figure 1:
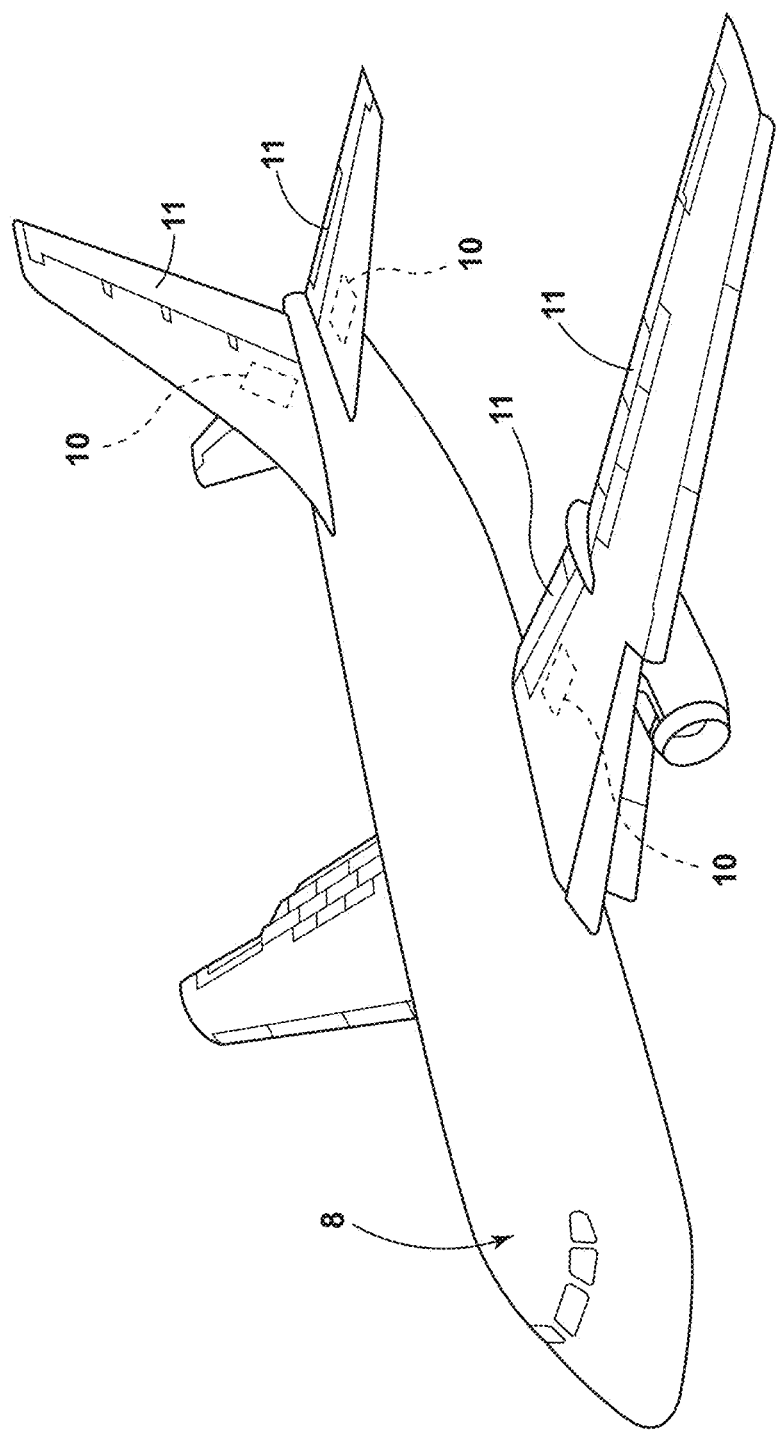
FIG. 1 is a perspective view of an aircraft that includes a plurality of rotary actuators, according to one embodiment.
Figure 2:
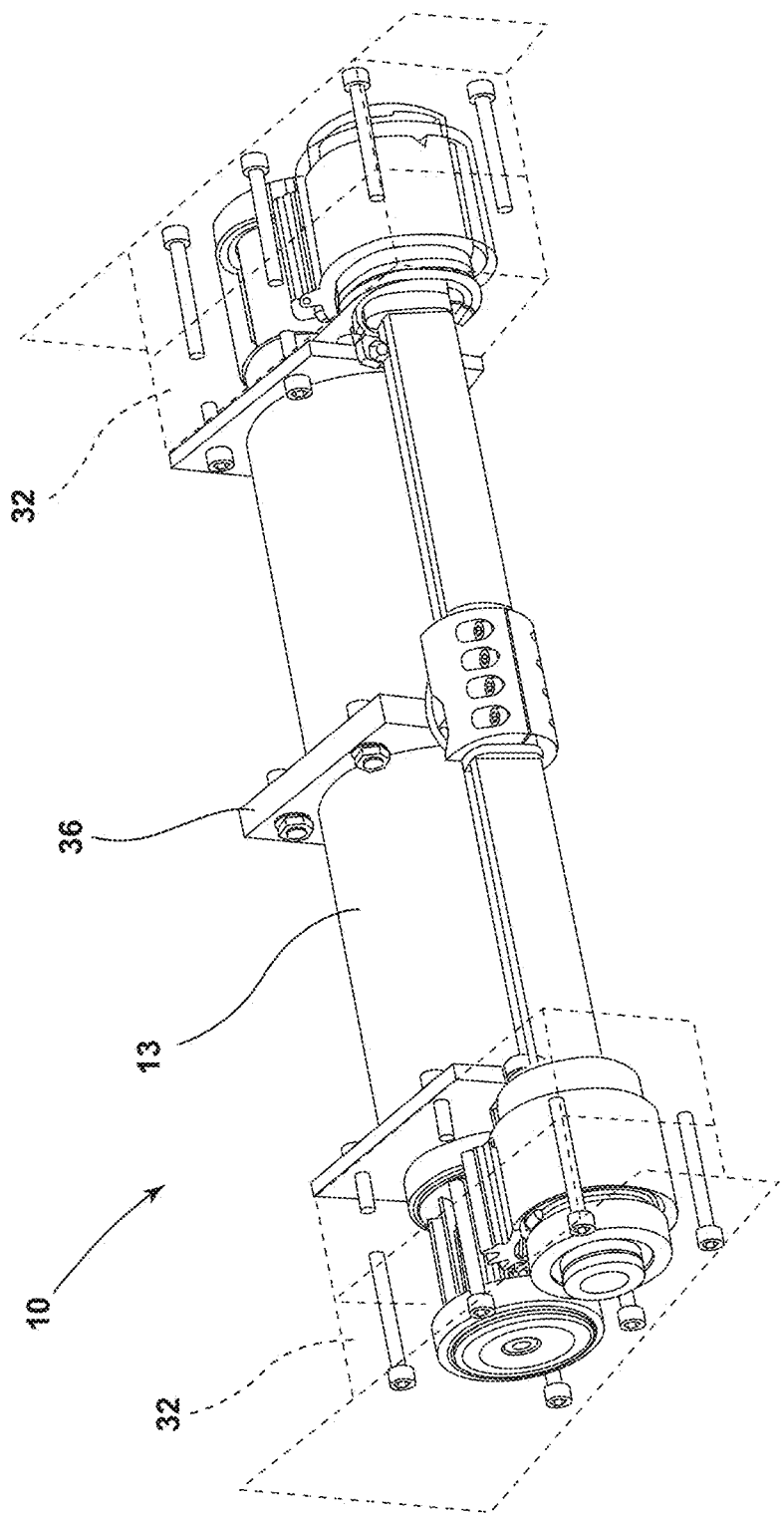
FIG. 2 is a perspective view of a rotary actuator for a flight control surface, according to one embodiment.
Figure 3:
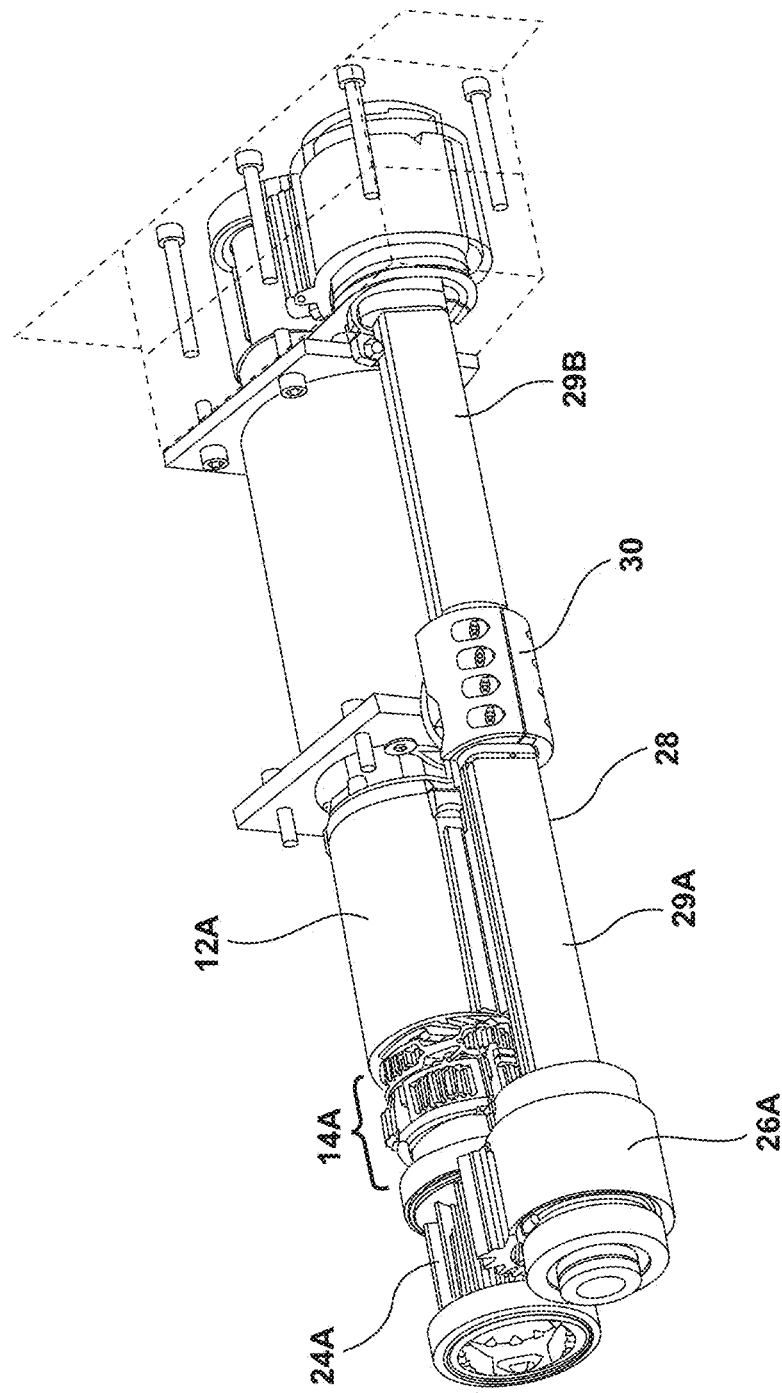
FIG. 3 is a perspective view of a portion of the rotary actuator of FIG. 1, illustrating a first electric motor and a first powertrain of the rotary actuator, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis.

Referring now to FIGS. 1-7, a rotary actuator 10 is disclosed. The rotary actuator 10 may be configured to operate a flight control surface 11 of an aircraft 8, in some embodiments, as illustrated exemplarily in FIG. 1. A variety of types of aircrafts 8 (e.g., plane, jet, drone, etc.) and flight control surfaces 11 (e.g., flaps, ailerons, spoilers, slats, elevators, rudders, and tabs, etc.) are contemplated. The rotary actuator 10 includes a first electric motor 12A that, when energized, is configured to drive rotation of a first drive gear 24A in either a first direction D1 or a second direction D2. The rotary actuator 10 can include a second electric motor 12B in addition to the first electric motor 12A. In such embodiments, the first and second electric motors 12A, 12B are configured to simultaneously rotate the respective first drive gear 24A and a respective second drive gear 24B in either the first direction D1 or the second direction D2. The first and second drive gears 24A, 24B engage respective first and second sector gears 26A, 26B arranged on an output shaft 28. Rotation of the first and second drive gears 24A, 24B in the first direction D1 causes rotation of the first and second sector gears 26A, 26B (and thus the output shaft 28) in the second direction D2. Likewise, rotation of the first and second drive gears 24A, 24B in the second direction D2 causes rotation of the first and second sector gears 26A, 26B (and thus the output shaft 28) in the first direction D1.

The first electric motor 12A is operably coupled with a first geartrain 14A. The first geartrain 14A includes at least one gearset 15. The at least one gearset 15 may include a plurality of gearsets 15. In some embodiments, the at least one gearset 15 includes at least one planetary gearset 15. In the embodiment illustrated in FIG. 4, the first geartrain 14A includes a plurality of planetary gearsets 15 arranged in series. In the illustrated embodiment, the first electric motor 12A includes a first shaft 44A that is operably connected to the first series arrangement of planetary gearsets 15 that form the first geartrain 14A, which includes a first planetary gearset 16, a second planetary gearset 18, and a third planetary gearset 20. The first shaft 44A is rotationally (and drivably) fixed to a sun gear of the first planetary gearset 16; a planetary carrier of the first planetary gearset 16 is rotationally fixed to a sun gear of the second planetary gearset 18; a planetary carrier of the second planetary gearset 18 is rotationally fixed to a sun gear of the third planetary gearset 20; and a planetary carrier of the third planetary gearset 20 is rotationally fixed to a first transition piece 34A that is rotationally fixed to the first drive gear 24A. In summary, the first electric motor 12A drives the first drive gear 24A via the intervening first geartrain 14A. Internally toothed ring gears 46, 48 of the planetary gearsets 16, 18, 20 can be at least one of fixed to, directly integrated with, and rotatably arranged within an elongated casing 13, as operably needed. The first electric motor 12A, the first geartrain 14A, the first transition piece 34A, and the first drive gear 24A form a first powertrain 60A.

The second electric motor 12B is operably coupled with a second geartrain 14B. The second geartrain 14B includes at least one gearset 15. The at least one gearset 15 may include a plurality of gearsets 15. In some embodiments, the at least one gearset 15 includes at least one planetary gearset 15. In the embodiment illustrated in FIG. 4, the second geartrain 14B includes a plurality of planetary gearsets 15 arranged in series. In the illustrated embodiment, the second electric motor 12B includes a second shaft 44B that is operably connected to the second series arrangement of planetary gearsets 15 that form the second geartrain 14B, which include first, second, and third planetary gearsets 16, 18, 20. The second shaft 44B is rotationally (and drivably) fixed to a sun gear of the first planetary gearset 16; a planetary carrier of the first planetary gearset 16 is rotationally fixed to a sun gear of the second planetary gearset 18; a planetary carrier of the second planetary gearset 18 is rotationally fixed to a sun gear of the third planetary gearset 20; and a planetary carrier of the third planetary gearset 20 is rotationally fixed to a second transition piece 34B that is rotationally fixed to the second drive gear 24B. In summary, the second electric motor 12B drives the second drive gear 24B via the intervening second geartrain 14B. Internally toothed ring gears 46, 48 of the planetary gearsets 16, 18, 20 can be at least one of fixed to, directly integrated with, and rotatably arranged within the elongated casing 13, as operably needed. The second electric motor 12B, the second geartrain 14B, the second transition piece 34B, and the second drive gear 24B form a second powertrain 60B.

The first and second powertrains 60A, 60B are coaxial and/or aligned with each other within the elongated casing 13. The elongated casing 13 can include a first piece 13A and a second piece 13B that are joined together by a mounting 36. The first electric motor 12A is axially adjacent to the second electric motor 12B. In some implementations, the first and second electric motors 12A, 12B are arranged at an axial inner-most portion of the aligned first and second powertrains 60A, 60B and the first and second drive gears 24A, 24B are arranged at an axial outer-most portion of the aligned first and second powertrains 60A, 60B. The first and second powertrains 60A, 60B may be in a parallel drive arrangement for the output shaft 28, as illustrated exemplarily in FIG. 4. In the illustrated embodiment, the axis about which the first and second electric motors 12A, 12B drive the first and second shafts 44A, 44B is parallel to the axis about which the output shaft 28 rotates.

Figure 4:
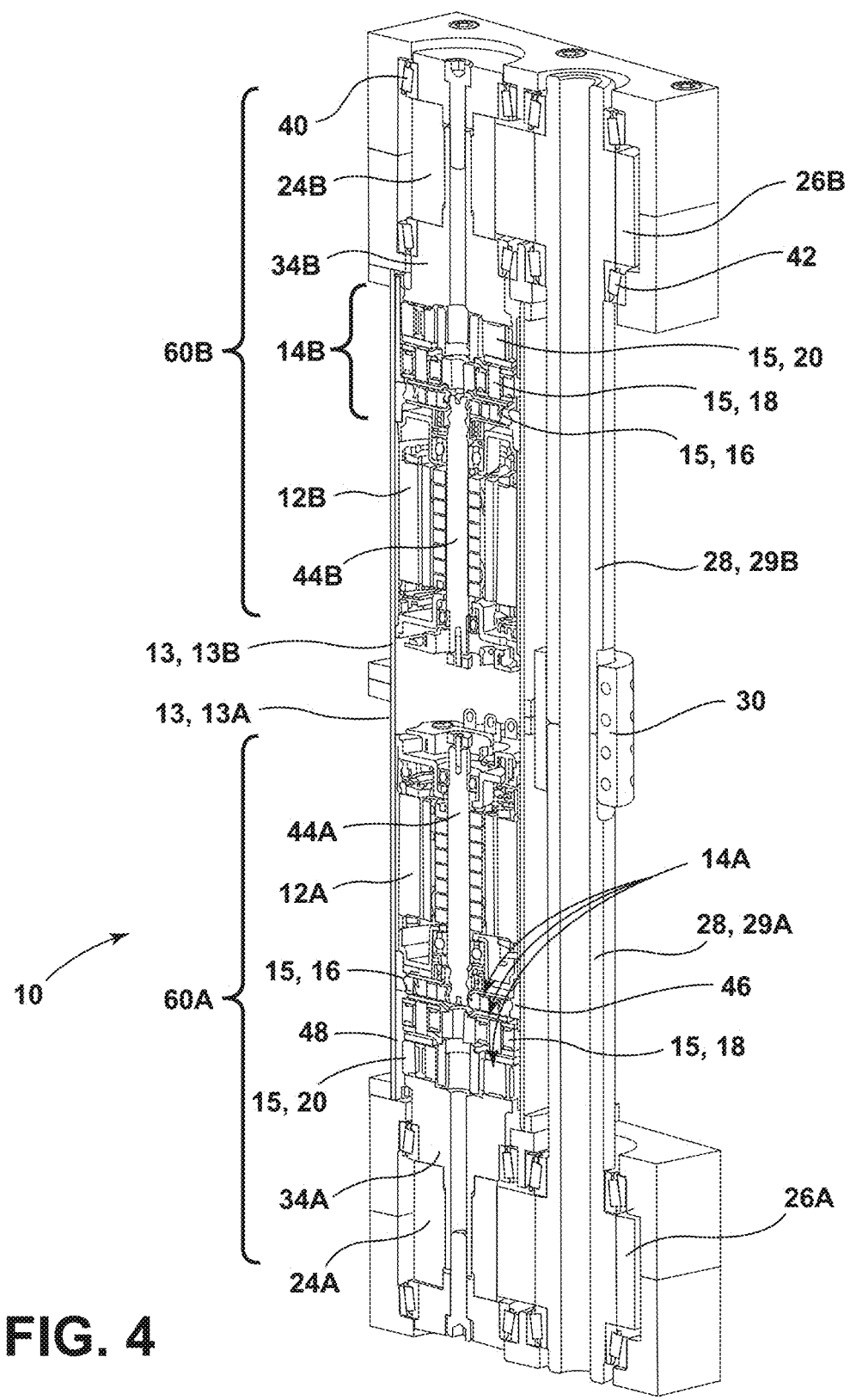
FIG. 4 is a cross-sectional view of the rotary actuator of FIG. 1 taken at line IV-IV, illustrating first and second electric motors, and first and second powertrains, according to one embodiment.
Figure 5:
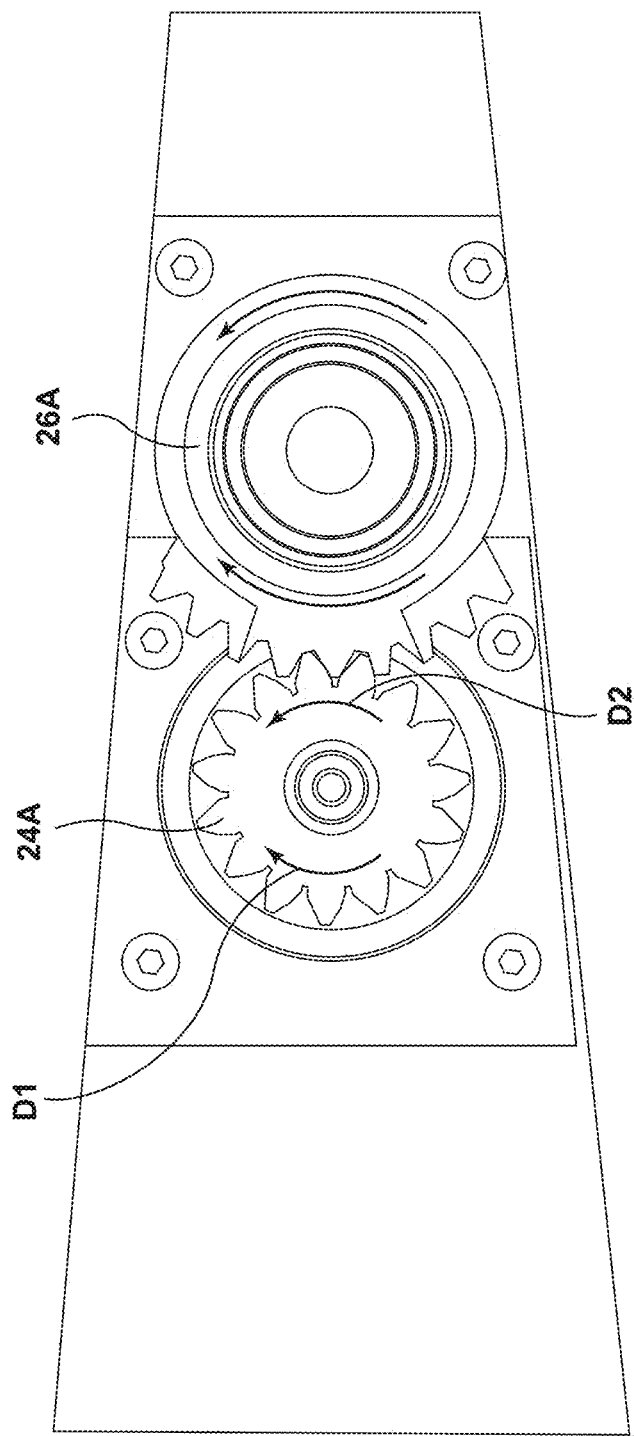
FIG. 5 is an elevational view of a portion of a rotary actuator, illustrating a gearing interface of a drive gear of a powertrain of the rotary actuator and a sector gear of an output shaft of the rotary actuator, according to one embodiment.
Figure 6:
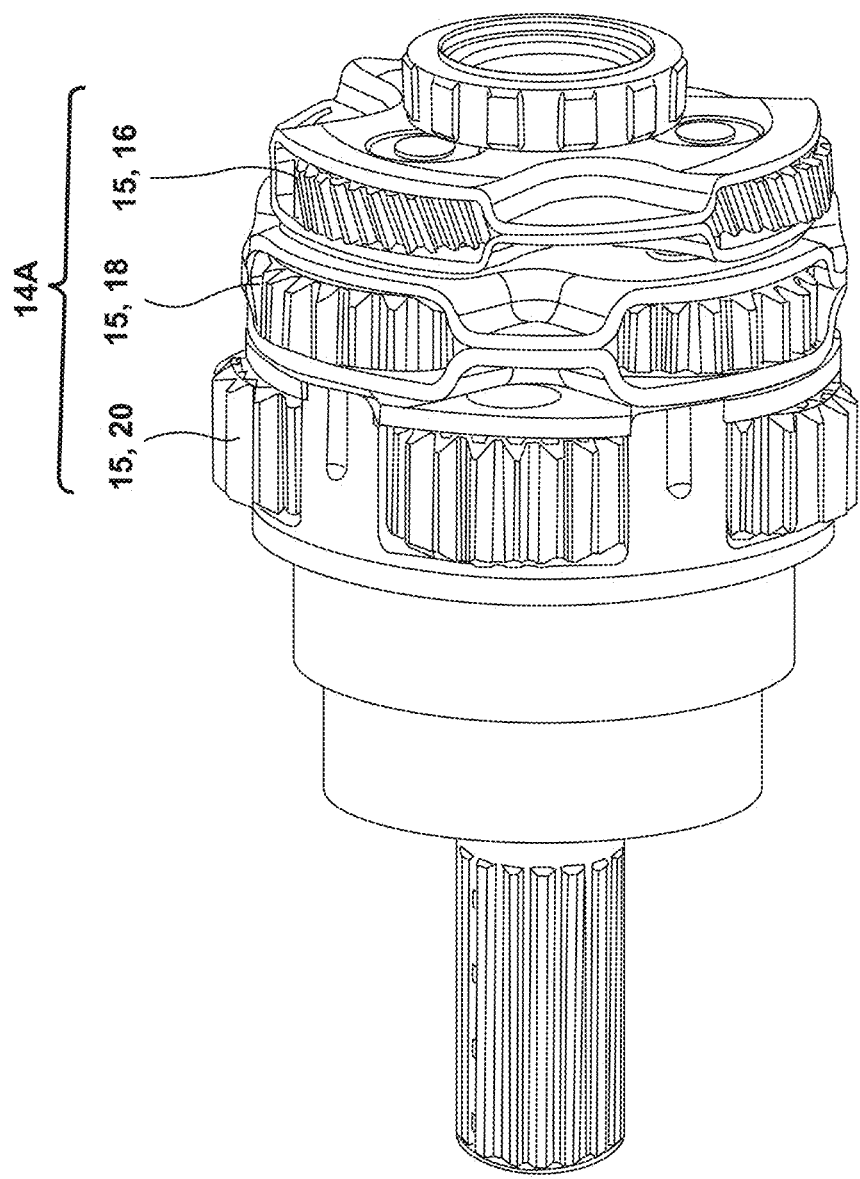
FIG. 6 is a perspective view of a series arrangement of planetary gearsets for a rotary actuator, according to one embodiment.

As illustrated in FIG. 4, the first powertrain 60A includes the first electric motor 12A, the first geartrain 14A, and the first drive gear 24A. The second powertrain 60B includes the second electric motor 12B, the second geartrain 14B, and the second drive gear 24B. The first and second powertrains 60A, 60B are arranged relative to each other, such that the first electric motor 12A is positioned axially adjacent to the second electric motor 12B. Further, the first geartrain 14A is positioned axially adjacent to the first electric motor 12A, and the second geartrain 14B is positioned axially adjacent to the second electric motor 12B, such that the first and second electric motors 12A, 12B are positioned axially between the first and second geartrains 14A, 14B. In the illustrated embodiment, the first and second drive gears 24A, 24B are positioned at axial ends of the first and second powertrains 60A, 60B, respectively, opposite each other. As such, the first and second electric motors 12A, 12B and the first and second geartrains 14A, 14B are positioned axially between the first and second drive gears 24A, 24B.

The first and second powertrains 60A, 60B are supported within a housing 32 via rolling element bearings 40. The output shaft 28 is supported within the housing 32 via rolling element bearings 42. The rolling element bearings 40, 42 can provide both radial and axial support. Any suitable bearing can be utilized in place of the rolling element bearings 40, 42 shown within the figures. In some embodiments, separate bearings for such radial and axial support can be implemented. For ease of assembly, the output shaft 28 can be split into a first output shaft piece 29A that is rotationally and axially fixed to a second output shaft piece 29B via an output shaft coupler 30. The elongated casing 13 can be attached to the housing 32 via any suitable means, including, but not limited to, welding, press-fitting, or fastening.

In an exemplary embodiment, the first powertrain 60A and the second powertrain 60B can each be configured to accommodate a design torque requirement of the output shaft 28 that is required to actuate the flight control surface 11. Therefore, if one of the first or second electric motors 12A, 12B fails, the output shaft 28, and thus, the corresponding flight control surface 11 remains operable. In some embodiments, the first powertrain 60A and the second powertrain 60B can be configured to accommodate the design torque requirement of the output shaft 28 only when the output torques of the first and second electric motors 12A, 12B are combined.

The first and second sector gears 26A, 26B each have teeth cut along a sector of a circumference in order to fulfill functional requirements while offering reduced packaging space. In an exemplary embodiment, the output shaft 28 rotates less than one revolution in either of the first direction D1 or second direction D2. In some embodiments, the combined rotation of the output shaft 28 in the first direction D1 and the second direction D2 is less than one revolution. In some implementations, singular or combined rotations of the output shaft 28 can be greater than one revolution.

The gear ratios achieved by the first and second geartrains 14A, 14B, the first and second drive gears 24A, 24B, and the first and second sector gears 26A, 26B facilitate adequate torque magnification (and speed reduction, if desired) to adjust a flight control surface 11 that is mechanically or operably connected to the output shaft 28, or further, integrated with the output shaft 28. It is contemplated that the rotary actuator 10 may be used in applications other than adjustment of flight control surfaces 11 of an aircraft 8.

Figure 7:
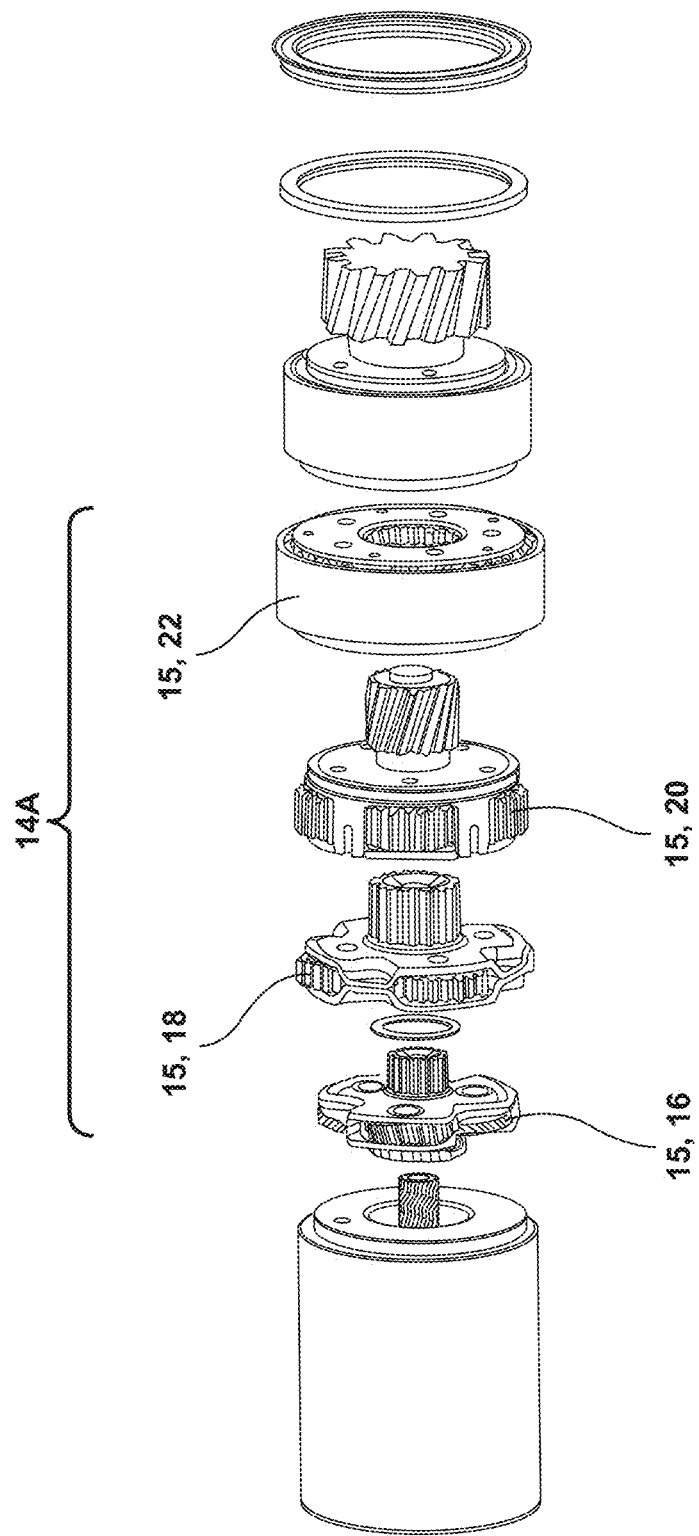
FIG. 7 is an exploded perspective view of a series arrangement of planetary gearsets for a rotary actuator, according to one embodiment.

Referring now to FIG. 7, a first series arrangement of planetary gearsets in an exemplary embodiment of the first geartrain 14A is shown that includes a fourth planetary gearset 22. This arrangement can provide a higher torque output than the first series of arrangement of planetary gearsets relative to the embodiment of the first geartrain 14A illustrated in FIG. 6 that contains only three planetary gearsets. Various numbers of series-arranged planetary gearsets that achieve a required torque and/or speed requirement are contemplated.

While example embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMERALS

8 Aircraft
10 Rotary actuator
11 Flight control surface
12A First electric motor
12B Second electric motor
13 Elongated casing
13A First piece
13B Second piece
14A First geartrain
14B Second geartrain
15 Gearset
16 First planetary gearset
18 Second planetary gearset
20 Third planetary gearset
22 Fourth planetary gearset
24A First drive gear
24B Second drive gear
26A First sector gears
26B Second sector gears
28 Output shaft
29A First output shaft piece
29B Second output shaft piece
30 Output shaft coupler
32 Housing
34A First transition piece
34B Second transition piece
36 Mounting
40 Rolling element bearings
42 Rolling element bearings
44A First shaft
44B Second shaft
46 Ring gears
48 Ring gears
60A First powertrain
60B Second powertrain
D1 First direction
D2 Second direction

What is claimed is:

1. A rotary actuator for a flight control surface, comprising:
a first electric motor drivably connected to a first geartrain having at least two planetary gearsets arranged in series;
a first drive gear driven by the first electric motor via the first geartrain, wherein the first geartrain and the first drive gear define a first powertrain;
a second electric motor drivably connected to a second geartrain having at least two planetary gearsets arranged in series, wherein the second geartrain is separate from the first geartrain;
a second drive gear driven by the second electric motor via the second geartrain, wherein the second geartrain and the second drive gear define a second powertrain that is arranged coaxially with the first powertrain; and
an output shaft driven simultaneously via the first drive gear and the second drive gear, wherein the first electric motor and the second electric motor are axially adjacent to each other, such that the first and second electric motors are positioned axially between the first geartrain and the second geartrain.

2. The rotary actuator of claim 1, wherein the first drive gear and the second drive gear are arranged at axial outer ends of the first powertrain and the second powertrain, respectively.

3. The rotary actuator of claim 1, wherein the first and second geartrains each comprise three planetary gearsets.

4. The rotary actuator of claim 1, wherein the output shaft is configured to rotate less than one revolution.

5. The rotary actuator of claim 1, wherein the output shaft further comprises:
a first sector gear arranged at a first end of the output shaft and engaged with the first drive gear; and
a second sector gear arranged at a second end of the output shaft and engaged with the second drive gear.

6. A rotary actuator for moving a flight control surface of an aircraft, comprising:
a first electric motor drivably connected to a first geartrain having a plurality of planetary gearsets arranged in series;
a first drive gear driven by the first electric motor via the first geartrain, wherein the first geartrain and the first drive gear define a first powertrain; and
an output shaft arranged parallel to the first powertrain and configured to be driven by the first drive gear, the output shaft having a first sector gear that is engaged with the first drive gear.

7. The rotary actuator of claim 6, wherein a full stroke of the rotary actuator prompts less than a full revolution of the output shaft.

8. The rotary actuator of claim 6, further comprising:
a second electric motor drivably connected to a second geartrain having at least one gearset; and
a second drive gear driven by the second electric motor via the second geartrain, wherein the second geartrain and the second drive gear define a second powertrain, wherein the second powertrain is operably coupled with the output shaft, such that the first and second powertrains are configured to simultaneously drive the output shaft.

9. The rotary actuator of claim 8, wherein the at least one gearset comprises:
at least one planetary gearset.

10. The rotary actuator of claim 9, wherein the at least one planetary gearset comprises:
a plurality of planetary gearsets arranged in series.

11. The rotary actuator of claim 8, wherein the first and second electric motors are axially adjacent to each other.

12. The rotary actuator of claim 11, wherein the first geartrain is axially adjacent the first electric motor opposite the second electric motor.

13. The rotary actuator of claim 12, wherein the second geartrain is axially adjacent the second electric motor opposite the first electric motor.

14. The rotary actuator of claim 6, wherein the first geartrain comprises three planetary gearsets.

15. A rotary actuator, comprising:
- a first powertrain that includes a first electric motor, a first geartrain operably coupled with the first electric motor and having at least one gearset, and a first drive gear operably coupled with the first electric motor via the first geartrain;
- a second powertrain that includes a second electric motor, a second geartrain operably coupled with the second electric motor and having at least one gearset, and a second drive gear operably coupled with the second electric motor via the second geartrain, wherein the first electric motor is positioned axially adjacent to the second electric motor, the first geartrain is positioned axially adjacent to the first electric motor, and the second geartrain is positioned axially adjacent to the second electric motor, such that the first and second electric motors are positioned axially between the first and second geartrains; and
- an output shaft arranged parallel to the first and second powertrains and configured to be driven by the first and second powertrains.

16. The rotary actuator of claim 15, wherein the at least one gearset of the first geartrain comprises at least one planetary gearset, and the at least one gearset of the second geartrain comprises at least one planetary gearset.

17. The rotary actuator of claim 16, wherein the at least one planetary gearset of the first geartrain comprises a plurality of planetary gearsets arranged in series, and the at least one planetary gearset of the second geartrain comprises a plurality of planetary gearsets arranged in series.

18. The rotary actuator of claim 15, wherein driven rotation of the output shaft is configured to move a flight control surface of an aircraft.

* * * * *